United States Patent [19]

Wreede et al.

[11] Patent Number: 4,983,003
[45] Date of Patent: Jan. 8, 1991

[54] ALTERNATE METHODS OF SIDE LOBE REDUCTION IN HOLOGRAMS

[75] Inventors: John E. Wreede, Monrovia; James A. Arns, Los Angeles, both of Calif.

[73] Assignee: Hughes Aircraft Company, Los Angeles, Calif.

[21] Appl. No.: 263,655

[22] Filed: Oct. 27, 1988

[51] Int. Cl.$^5$ .......................... G03H 1/02; G03H 1/08
[52] U.S. Cl. .................... 350/3.61; 350/3.66; 350/3.7
[58] Field of Search ........................... 430/1, 2; 350/3.6–3.91

[56] References Cited

U.S. PATENT DOCUMENTS

| | | | |
|---|---|---|---|
| 4,329,409 | 5/1982 | Wreede et al. | 350/3.6 |
| 4,687,720 | 8/1987 | Wreede et al. | 430/2 |
| 4,799,746 | 1/1989 | Wreede | 350/3.6 |
| 4,815,800 | 3/1989 | Chern et al. | 350/3.7 |
| 4,818,045 | 4/1989 | Chang | 350/3.7 |
| 4,826,290 | 5/1989 | Wreede et al. | 350/3.61 |
| 4,854,674 | 8/1989 | Wreede et al. | 350/3.7 |

*Primary Examiner*—Bruce Y. Arnold
*Assistant Examiner*—Thong Nguyen
*Attorney, Agent, or Firm*—Leonard A. Alkov; Wanda K. Denson-Low

[57] ABSTRACT

High side lobes shown in a hologram efficiency curve are suppressed by reducing the effective sensitivity of a holographic recording medium by a plurality of film layers of gelatin such that there is a continuous increase in sensitivity toward the center of the layers. This makes the recording medium more spectrally selective and increases the "see-through" characteristic. A holographic fringe pattern with a normally uniform modulation recorded in such holographic medium layers will produce a hologram having a modulation in refractive index which is virtually zero at the surfaces and which increases toward the center of the medium. The layers in the recording medium can have varying degrees of photosensitivity. However, when combined, the layers provide an overall sensitivity which can be depicted as a generally sinusoidal curve. The generally smooth transition in sensitivity from one layer to the next is largely achieved by the mixing of layers at their interfaces.

11 Claims, 1 Drawing Sheet

4,983,003

ALTERNATE METHODS OF SIDE LOBE REDUCTION IN HOLOGRAMS

BACKGROUND OF THE INVENTION

1. Field of the Invention

The invention relates generally to holography, and more particularly has reference to improving reflection holograms by reducing unwanted side lobes in the spectral pattern.

2. Description of the Prior Art

A dichromated gelatin phase reflection hologram consists of a thin layer of photoreactive gelatin on a transparent substrate which has been exposed to in-phase laser beams from opposite sides of the substrate. The beams intersect at the gelatin layer to set up an interference pattern which is recorded in the gelatin theoretically as a sinusoidal modulation in the index of refraction of the gelatin. A pattern of holographic fringes corresponding to the modulation of the index of refraction defines the hologram. Holograms have a number of uses.

In modern aircraft, both military and commercial, it is important that a substantial quantity of information be presented to the pilot while he is viewing the outside world. The holographic head-up display (HUD) has been developed for this purpose and provides relevant scale, alphanumerics, symbology, gun sight reticle (in fighter aircraft) and other information displays superimposed on the pilot's forward field of view. The information display is generated on a cathode ray tube and projected through a relay lens system to a transparent combiner screen located between the pilot and the aircraft windscreen. The combiner, which includes a holographic film, reflects the projected images to the pilot's eyes while affording him an unobstructed view of the outside world through the combiner and windscreen.

Another use of holographic films has been in visors designed to protect eyes from damaging light exposure, such as might be encountered from an incoming laser beam. A holographic element incorporated into the visor diffracts and redirects incoming laser light out of the field of vision. A cone of virtually total reflection for a given wavelength can be provided to protect the user's eyes from incident damaging light beams.

A hologram can act as a wavelength selective filter. The uniform sinusoidal modulation of refractive index which is theoretically present in holograms produces an efficiency (bandpass) curve which has high side lobes. In practice, holograms using dichromated gelatin recording mediums have even higher side lobes (asymmetric) than theory predicts because the gelatin processing creates nonsinusoidal fringe modulation. Side lobes are undesirable because they can produce ghost images and degrade photopic see-through.

In theory, side lobes can be reduced by varying the modulation of the refractive index as a function of depth throughout the recording medium. See Environmental Research Institute of Michigan Report AFOSR-TR-81-0196. It would seem possible to vary the fringe modulation throughout the volume of the holographic recording medium by varying the concentration of photosensitive material in the medium or by making the holographic exposure at a wavelength which is highly absorptive. However, neither approach has apparently been achieved in practice. The adjustment which is possible by varying concentration is not sufficient. Variation in modulation by exposure can only occur if the exposure level is high enough to use up available reactive sites. Because the reactive sites in dichromated gelatin are dichromate ions, the exposure levels which can be used are limited to those effective with such ions. Moreover, tailoring the shape of the variation to tailor the side lobes requires selection of a wavelength capable of the proper absorbency level. For practical purposes, lasers are only available in wavelengths determined by common usage and by existing laser equipment. Hence, there is not enough flexibility in wavelength selection to permit use of the proper wavelength in all cases.

A standard state-of-the-art procedure for reducing sidelobes is nonuniform processing of the holograms. If the processing is done relatively hot and for a reduced time, the fringes are spaced farther apart near the surface (outside), whereas they are closer together near the substrate. This procedure reduces sidelobes, but has at least two drawbacks. First, the bandwidth of the hologram itself is increased to greater than a theoretical bandwidth. This might be overcome by using a thicker photosensitive layer, which would have a smaller theoretical bandwidth. Secondly, this artificially broadened bandwidth is difficult to control.

One approach by the present inventors to minimize side lobes is disclosed in U.S. Pat. No. 4,687,720. Therein, a method is disclosed which involves exposing opposed surfaces of a recording medium with filtered incoherent light, either before or after a holographic exposure with coherent light. The incoherent exposure produces controlled desensitization of the medium, resulting in a sensitivity profile which increases continuously to a maximum near the center of the layer.

A pending application Ser. No. 06/684,538 entitled "Flare Reduction in Holograms" by John E. Wreede and Mao-Jin J. Chern, now U.S. Pat. No. 4,815,800, describes a technique for modifying the modulation of refractive index along surface regions of the holographic medium. However, that technique is concerned solely with elimination of surface diffraction effects inherent in slant fringe holograms. It does not address the problem of side lobes, which are primarily a problem in nonslant fringe holograms.

Accordingly, additional and alternative techniques for achieving a desired variation in fringe modulation are needed.

SUMMARY OF THE INVENTION

An object of the present invention is to provide holograms in which side lobes are suppressed.

A further object of the present invention is to provide improved holographic HUDs and improved laser eye protection devices.

Still another object of the present invention is to provide methods for making a hologram having spectral reflectivity which is substantially free of side lobes.

The present invention suppresses the high side lobes shown in a hologram efficiency curve by reducing the effective sensitivity of the holographic recording medium, for example, by a plurality of layers of dichromated gelatin such that there is a continuous increase in sensitivity toward the center of the layers. This makes the recording medium more spectrally selective and increases the "see-through" characteristic. A holographic fringe pattern with a normally uniform modulation recorded in such holographic medium layers will produce a hologram having a modulation in refractive index which is virtually zero at the surfaces and which increases toward the center of the medium.

More specifically, the layers in the recording medium can have varying degrees of photosensitivity. However, when combined, the layers provide an overall sensitivity which can be depicted as a generally sinusoidal curve. The generally smooth transition in sensitivity from one layer to the next is largely achieved by the mixing of layers at their interfaces.

The objects of the present invention can best be seen from examination of the accompanying specification, claims, and drawings.

DETAILED DESCRIPTION OF THE PREFERRED EMBODIMENTS

The following description is provided to enable any person skilled in the art to which the present invention pertains, or with which it is most nearly connected, to make and use the same, and sets forth the best mode contemplated by the inventors of carrying out their invention. Various modifications, however, will remain readily apparent to those skilled in the art, since the generic principles of the present invention have been defined herein specifically to provide improved methods for side lobe reduction.

Figure 1:
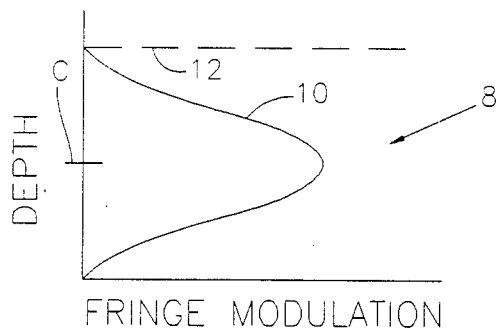
FIG. 1 shows a theoretical sensitivity curve in which side lobes have been minimized.

FIG. 1 depicts a theoretical sensitivity or spectral reflectivity curve 10 which is a function of depth of a recording medium 8 versus fringe modulation intensity. The point C depicted on the ordinate axis that measures depth indicates a depth at which an imaginary center line (not shown) passes through the recording medium 8. The dashed line 12 denotes a thickness of the recording medium 8 or, in other words, a distance of a front surface of a recording medium as measured from a substrate (not shown) that supports the recording medium 8. A depth of zero which is on the abscissa axis for fringe modulation might then be considered a rear surface of the recording medium 8, i.e., the surface immediately adjacent the substrate.

As shown in FIG. 1, the sensitivity curve 10 is generally sinusoidal in shape and has its peak generally at the center of the recording medium 8. As is well known, such a curve indicates the absence of side lobes in reflection holograms. Accordingly, the present invention seeks to achieve, in at least certain preferred embodiments, a generally sinusoidal sensitivity curve regardless of the particular structural arrangement of the recording medium 8.

Figure 2:
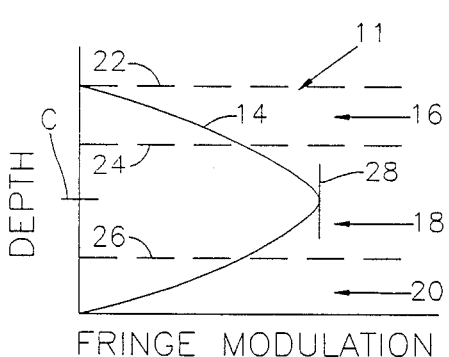
FIG. 2 shows a combined sensitivity curve according to one embodiment of the present invention wherein the layers of the recording medium are of various sizes.

FIG. 2 depicts a combined sensitivity curve 14 according to a first preferred embodiment of the present invention. In this particular embodiment, a recording medium 11 includes three layers 16, 18, 20. The dashed line 26 denotes a maximum depth of the layer 20 as well as an interface or transition area between the layers 18, 20. Similarly, the dashed line 24 denotes a maximum depth of the layer 18 as well as an interface or transition area between the layers 16, 18. As will become more evident below, the transition areas are not merely lines between layers, but areas surrounding the designated lines through which an optical or spectral sensitivity changes. The dashed line 22 indicates the depth of the front surface of the entire recording medium 11 as well as a maximum depth of the layer 16.

By way of example, the layer 16 may be undichromated gelatin having a thickness of approximately 5 microns. The layer 18 may be of dichromated gelatin approximately 10 microns in thickness. The layer 20 may be constructed in the same manner as the layer 16.

The gelatin in this particular embodiment is a 300 bloom strength porksin. The casting concentration is about 8% gelatin in deionized water to which 20mM of ammonium dichromate has been added. After casting a 50° C. solution, the substrate is cooled to 5° C. from 45 minutes to 16 hours to allow the gelatin to set. The gel is then dried by first bringing it to equilibrium in air of 30% relative humidity at 20° C. It is further dried in air with less relative humidity to result in the gelatin film having a 1 to 5% water content.

With the above construction of the layers 16, 18, 20, the effective sensitivity thickness is 10 microns, while the actual photosensitive material is approximately 20 micrometers. To obtain the combined sensitivity curve in a generally sinusoidal shape, the layers 16, 18, 20 are mixed at their interfaces in generally the following fashion. The amount and rate of mixing of layers 16, 18, 20 (as well as those described below in other preferred embodiments) is a function of the temperature of coating the layer and the hardness of the previously-coated layer at the time of coating. In this first preferred embodiment, suitable mixing among the layers can be obtained by drying the layer 20, which would be on the substrate, in the manner described above at above 30% relative humidity. Just after such drying of the layer 20, a second layer 18 can then be applied and left to reach equilibrium at 30% relative humidity. Then, both layers 18, 20 are set at about 0% relative humidity for two hours at about 45° C. The third layer 16 is then provided by coating onto the second layer in the fashion in which the second was coated onto the first. The third layer is applied and left to reach equilibrium at 30% relative humidity and then set at 0% relative humidity.

By mixing the layers 16, 18, 20 in the fashion described above, generally smooth transitions in sensitivity are achieved among the layers. Without the mixing according to the present invention, the layer 16 may, for example, have an intrinsic sensitivity that has a zero fringe modulation through the entire thickness of the layer 16. The same would then be true with regard to the layer 20 in this particular embodiment. In contrast, the layer 18 may have an intrinsic sensitivity depicted in FIG. 2 by the vertical line 28, which indicates a constant fringe modulation over the entire thickness of the layer 18. However, as a result of the mixing in this particular embodiment of the present invention, a stepshaped sensitivity curve, which might otherwise exist overall for the three layers due to abrupt changes in sensitivity among layers, is avoided. Instead, a substantially smooth transition in sensitivity among the layers is achieved, as depicted by the combined sensitivity curve 14. This is particularly achieved by the transition areas 24, 26 which present smooth changes in sensitivity.

Figure 3:
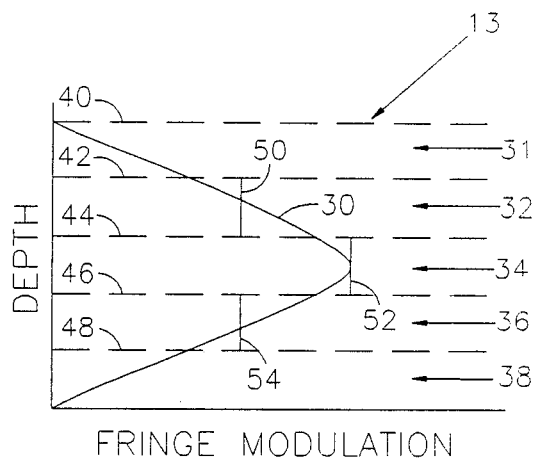
FIG. 3 shows a combined efficiency curve according to a second embodiment of the present invention wherein the layers are of generally the same thickness.

FIG. 3 depicts a combined sensitivity curve 30 according to a second preferred embodiment of the present invention. In this particular embodiment, five layers 31, 32, 34, 36, 38 are provided in a recording medium 13, and each layer may, for example, be made of dichromated gelatin. The amount of ammonium dichromate in the gelatin varies from one layer to another, as indicated by the intrinsic sensitivity curves 50, 52, 54. Those three curves indicate the photosensitivity of the layers 32, 34, 36, respectively. As to the layers 31, 38, their intrinsic sensitivity curves may lie on the coordinate axis to indicate an essentially zero photosensitivity. The dashed lines 42, 44, 46, 48 indicate transition or interface areas among the layers, while the dashed line 40 indicates the maximum depth of the recording medium.

The intrinsic photosensitivities of the individual layers are combined in the second embodiment to provide the combined sensitivity curve 30. This is the result of a relatively minimal amount of mixing, in comparison to the first embodiment, among the layers in the following manner. The layer 38 is coated to the substrate at 30% relative humidity, 20° C., and then dried for 24 hours at less than 1% relative humidity. Then, the layer 36 is coated to the layer 38 at about 25° C. The layer 36 is then dried at less than 1% relative humidity for 24 hours, and the next layer 34 is applied at about 25° C. and dried like the layer 36. This process of applying layers at 25° C. and drying at 1% relative humidity is repeated for the remaining layers.

Figure 4:
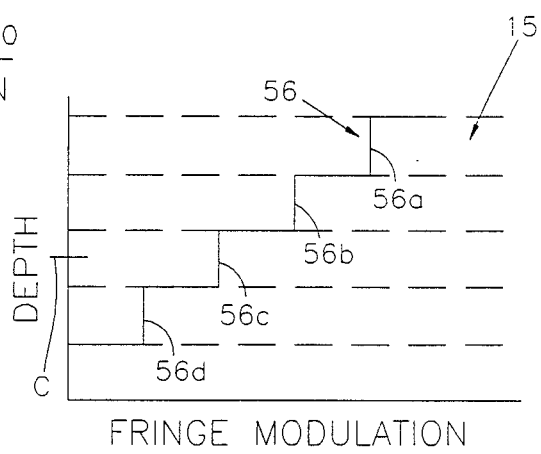
FIG. 4 shows a sensitivity curve which provides stepped transitions among layers of the recording medium.

FIG. 4 depicts a third preferred embodiment of the present invention wherein multiple layers are provided, as indicated by the horizontal dashed lines. However, unlike the second preferred embodiment, the third preferred embodiment provides a recording medium 15 with a stepped combined efficiency curve 56, rather than a sinudoidal-shaped curve. In this preferred embodiment, the recording medium provides a tapered sensitivity in one direction only. Sensitivity decreases towards the layer immediately adjacent the substrate. In this embodiment, each layer has an intrinsic sensitivity curve that lies on a part of the combined, stepped sensitivity curve 56. The uppermost layer shown in FIG. 4 has an intrinsic sensitivity curve 56a, the layer below that has a curve 56b, and the remaining layers have respective curves 56c, d. The lowermost layer may have its intrinsic sensitivity curve lying directly on the ordinate axis to indicate an essentially zero sensitivity or fringe modulation. The layers are applied in succession, as in the second embodiment, but after each layer, the substrate is baked at 52° C. for approximately one-half hour after it has been dried at room temperature.

Figure 5:
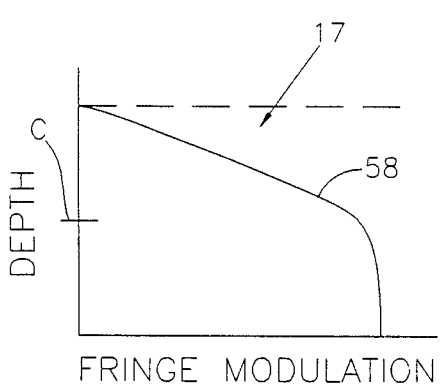
FIG. 5 shows a sensitivity curve according to a fourth preferred embodiment of the present invention.

FIG. 5 depicts a method that is applicable to both reflection-type holograms and transmission-type holograms. According to this particular embodiment, a single layer is provided in a recording medium 17, as shown by the single horizontal dashed line in FIG. 5. According to this method, a short burst of a gas or vapor, which reacts with the layer, gradually diffuses into the volume of the layer. The gas might be formaldehyde for dichromated gelatin or hydrogen sulfide for a silver halide film. As seen in FIG. 5, by the diffusion of the gas or vapor, the sensitivity starts at a minimum or near zero amount at the air-layer interface, and generally increases towards the center of the layer, where the sensitivity then substantially levels to a constant. This method might be used in conjunction with the other preferred embodiments inasmuch as it is directed primarily at the air-layer interface of the recording medium.

As can be appreciated, the present invention provides alternative and different methods for reducing side lobes. These methods may have substantial impact on "magic mirror" type HUDs (i.e., ones which act as mirrors to one wavelength and transmit three colors near reflected wavelength) which cannot work as presently conceived without some form of side lobe reduction. Other types of HUDs and helmet-mounted displays will also be affected, particularly as the bend angle increases and the desired bandwidth increases. Minimizing the amount of "pink color," i.e., see-through loss, in these devices also increases their desirability.

The above only describes certain preferred embodiments of the present invention, and it is contemplated that various modifications to the above can be made but nevertheless come within the scope of the claims.

What is claimed is:

1. A holographic recording medium, comprising:
    a plurality of recording layers; and
    a plurality of transition areas among said recording layers, said transition areas providing transitions in optical sensitivity among said recording layers wherein generally smooth transitions in sensitivity are achieved among said layers.

2. The recording medium according to claim 1 wherein said recording layers are stacked upon one another.

3. The recording medium according to claim 1 wherein said recording layers have varying amounts of photosensitivity.

4. In an improved holographic recording medium having an efficiency curve which is substantially free of side lobes, the improvement comprising:
    a plurality of operatively interfacing recording medium layers having varying amounts of photosensitivity wherein said recording medium layers blend together at their respective interfaces to provide gradual changes in photosensitivity.

5. The improvement according to claim 4 wherein said mixed recording medium layers provide a single combined optical sensitivity.

6. The improvement according to claim 4 wherein said recording medium layers blend together at their respective interfaces to provide gradual changes in photosensitivity so as to provide smooth transitions of optical sensitivity among said recording medium layers.

7. The improvement according to claim 4 wherein said recording medium layers blend together at their respective interfaces to provide gradual changes in photosensitivity so as to provide stepped transitions of optical sensitivity among said recording medium layers.

8. The improvement according to claim 4 wherein said photosensitivity can start at about zero at the surfaces of said recording medium layers and increase toward the center of said recording medium layers.

9. A method of making a holographic recording medium, comprising the steps of:
    providing a plurality of recording layers, each recording layer having an intrinsic optical sensitivity; and
    placing said recording layers together to provide a single combined optical sensitivity that is a combination of said intrinsic optical sensitivities including blending said recording layers at transition areas among said recording layers.

10. The method according to claim 9 further including the step of exposing said recording layers to a gas.

11. The method according to claim 9 wherein said combined optical sensitivity is described by a sensitivity profile which is substantially zero at outermost recording layers and substantially at a maximum at innermost recording layers.

* * * * *